US008260202B2

(12) United States Patent
Chen et al.

(10) Patent No.: US 8,260,202 B2
(45) Date of Patent: Sep. 4, 2012

(54) METHOD FOR DETERMINING A PATH IN A LOCAL RADIO COMMUNICATION

(75) Inventors: Hui Chen, Shanghai (CN); Ingo Gruber, München (DE); Hui Li, Beijing (CN); Dan Yu, Beijing (CN)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 416 days.

(21) Appl. No.: 10/577,670

(22) PCT Filed: Oct. 21, 2004

(86) PCT No.: PCT/EP2004/052599
§ 371 (c)(1),
(2), (4) Date: Dec. 29, 2006

(87) PCT Pub. No.: WO2005/043836
PCT Pub. Date: May 12, 2005

(65) Prior Publication Data
US 2007/0133464 A1 Jun. 14, 2007

(30) Foreign Application Priority Data
Oct. 31, 2003 (DE) .................................. 103 50 904

(51) Int. Cl.
*H04B 7/00* (2006.01)
(52) U.S. Cl. ....................................... 455/41.2; 370/338
(58) Field of Classification Search ................... 370/338
See application file for complete search history.

(56) References Cited

U.S. PATENT DOCUMENTS

| 7,095,722 | B1 * | 8/2006 | Walke et al. .................. 370/315 |
| 2001/0036810 | A1 * | 11/2001 | Larsen .......................... 455/11.1 |
| 2003/0156558 | A1 * | 8/2003 | Cromer et al. ................ 370/331 |
| 2003/0202469 | A1 | 10/2003 | Cain |
| 2004/0219878 | A1 * | 11/2004 | Raji ............................. 455/11.1 |

FOREIGN PATENT DOCUMENTS

| WO | WO 01/41377 A1 | 6/2001 |
| WO | WO 02/084956 A1 | 10/2002 |

OTHER PUBLICATIONS

International Search Report for International Application No. PCT/EP2004/052599; mailed Feb. 3, 2005.

* cited by examiner

*Primary Examiner* — Kamran Afshar
*Assistant Examiner* — Joseph Dean, Jr.
(74) *Attorney, Agent, or Firm* — Staas & Halsey LLP

(57) ABSTRACT

In a case where an access point lies outside the direct radio transmission range of a first radio station of a radio communications system, and a routing runs between the first radio station and the access point that includes at least one additional radio station is known to the first radio station and the access point, information can be transmitted from the first radio station to the access point and from the latter to the first radio station via the routing. When the access point receives information relating to an interruption in the known routing from a radio station in the routing, the first radio station downstream of the access point is informed of the interruption in the known routing and subsequently initiates a process for determining a new routing between the first radio station and the access point.

11 Claims, 2 Drawing Sheets

METHOD FOR DETERMINING A PATH IN A LOCAL RADIO COMMUNICATION

CROSS REFERENCE TO RELATED APPLICATIONS

This application is based on and hereby claims priority to German Application No. 10350904.6 filed on Oct. 31, 2003, the contents of which are hereby incorporated by reference.

BACKGROUND OF THE INVENTION

In radio communication systems, information (for example voice, image information, video information, SMS (Short Message Service), MMS (Multimedia Messaging Service) or other data) is transmitted between sending and receiving station via a radio interface with the aid of electromagnetic waves. In this scenario the stations may be different types of subscriber-side radio stations, radio access points or base stations, depending on the actual embodiment of the radio communication system. The electromagnetic waves are radiated here using carrier frequencies which lie in the frequency band provided for the respective system.

Radio communication systems are often embodied as cellular systems e.g. conforming to the GSM (Global System for Mobile Communication) or UMTS (Universal Mobile Telecommunications System) standard having a network infrastructure consisting of base stations, devices for monitoring and controlling the base stations, and further network-side devices. Frequencies around 900, 1800 and 1900 MHz are used for the established cellular GSM (Global System for Mobile Communication) mobile radio system. Systems of this type essentially transmit voice, fax and short messages SMS (Short Message Service), as well as digital data.

Apart from these (supralocal) cellular, hierarchical radio networks organized over a wide area, there are also wireless local area networks (WLANs) with a radio coverage area that is generally much more limited geographically. With a diameter of up to several hundred meters, the cells covered by the WLANs are so small in comparison with typical mobile radio cells that they are referred to as microcells. Local area networks (LANs) are generally understood to mean communication networks extending from several tens of meters to up to 10 kilometers. However, the majority of LANs extend only over several hundred meters within buildings or within an organization (in-house networks).

Examples of different standards for WLANs are HiperLAN, DECT, IEEE 802.11, Bluetooth and WATM, although at the present time, particularly in the USA and Europe, products based on the IEEE 802.11 family appear to be establishing themselves almost exclusively as local radio-based networks. The radio interface defined according to the IEEE 802.11b standard for accessing local area networks corresponds in terms of functionality to a wired connection to local area networks (LANs), which nowadays have evolved into the standard in offices.

The non-licensed frequency range around 2.4 GHz is generally used for WLANs. Data transfer rates are in the range of up to 11 Mbps. Future WLANs could be operated in the 5 GHz range and attain data rates of more than 50 Mbps. Thus, subscribers to the WLANs have available to them data rates that are substantially higher than those that are offered by the next, third mobile radio generation (e.g. UMTS). This means that access to WLANs for connections with high bit rates is to be preferred for the transfer of large volumes of data, particularly in connection with internet accesses.

WLAN can be used to build a wireless local area communication network wherein radio stations can communicate with one another by radio via one or more hops (hop, multihop) and/or via WLAN radio access points (AP: Access Point). A connection to broadband data networks (BDNs) can be implemented via the WLAN radio access points. WLANs are frequently used to supplement cable-based LANs in certain working environments, so the radio access points, which are possibly interconnected via a wire-based LAN, forward the data transport from a radio station via the LAN. Each radio access point typically provides coverage for all the radio stations located in its radio transmission range or, as the case may be, its radio coverage area.

If a radio access point is located outside of the radio transmission range of a radio station, it is possible for data to be transmitted between the radio station and the radio access point by using other radio stations to receive and forward the data. Toward that end it is necessary to determine a path between the radio station and the radio access point. In particular as a result of the mobility of radio stations, however, a path that has been determined does not remain in existence for an unlimited length of time. It is therefore possible that after sending data the sender receives an error message which notifies it that the path used hitherto has failed, with the result that the data currently cannot be transmitted via the path to the receiver. In this case the sender, i.e. either the radio station or the radio access point, once again initiates a method for determining a path to the receiver.

SUMMARY OF THE INVENTION

An object underlying the invention is to disclose a method of the kind referred to at the beginning which permits economical use of radio resources during the determining of paths in a radio communication system. A radio station supporting a method of this kind and a computer program product for a radio station of this kind are also disclosed.

The radio communication system includes a radio access point and a plurality of radio stations. In this arrangement the radio access point is located outside of the direct radio transmission range of a first radio station. The radio access point requires information about a path which can be used for a message transfer between the radio access point and the first radio station, whereby the path can include one or more further radio stations. According to an aspect of the invention, the first radio station after the radio access point learns about the requirement for information and subsequently initiates a method for determining a path between the first radio station and the radio access point.

The radio access point and the first radio station cannot communicate with each other directly, i.e. without further radio stations being connected as intermediaries between them, because the radio access point is not located within the radio transmission range of the first radio station. Rather, before a message transfer takes place, a path must be determined between the first radio station and the radio access point, via which path the first radio station and the radio access point can communicate with each other.

The initiating of a method for determining a path can include, for example in the sending, by broadcast, of a request message for determining a path to neighboring radio stations. The actual embodiment of the path determination is of no relevance to the invention. The important thing is that the first radio station, and not the radio access point, initiates the method for determining a path even though it discovers later than the radio access point that a path is required between the first radio station and the radio access point.

A path between the radio access point and the first radio station is required by the radio access point in the situation where one or more messages are to be sent from the radio access point to the first radio station, as in the case of what is referred to as a "mobile terminated call". If no path to the first radio station is known to the radio access point, there is the possibility that the radio access point initiates a method for determining a path that can be used for the message transfer. According to an aspect of the invention, however, the first radio station learns that such a path is to be determined, whereupon the radio station, rather than the radio access point, initiates a method for determining a path.

It is advantageous if a base station is present which is located within the radio coverage area of the radio access point and if the first radio station is located within its radio coverage area, and if the radio access point notifies the base station about the requirement for the information about a path, and if the first radio station learns about the requirement for the information as a result of a notification by the base station. In this case the base station acts as a link between the radio access point and the first radio station, which transfers the task of initiating a method for determining a path from the radio access point to the first radio station. The notification about the requirement for a path can be explicit or implicit; thus, for example, the notification can include in the first radio station being requested to determine a path or to initiate a method for determining a path.

The base station is positioned in such a way that it can receive radio signals from the radio access point and that the first radio station can receive radio signals from it. In this case a base station can be part of any radio communication system, e.g. a NodeB of a UMTS system. Within the scope of the invention it is characterized solely in that it can receive signals from the radio access point and forward them—in modified form if necessary—to the first radio station. It is also possible to use a plurality of interconnected base stations in place of one base station, with a first base station receiving signals from the radio access point and a second base station sending signals to the first radio station.

In a development of the invention there is known to the first radio station and the radio access point a path between them which comprises one or more further radio stations. Accordingly, information can be transferred via the path from the first radio station to the radio access point and from the radio access point to the first radio station. The radio access point receives information about the failure of the known path from a radio station of the path. The first radio station learns about the failure of the known path after the radio access point. Following on from this it initiates a method for determining a new path between the first radio station and the radio access point.

In order to send information from the first radio station to the radio access point and vice versa the first radio station and the radio access point know a path, so they can insert the path e.g. into a header of a data packet that is to be sent. If this path fails, in the context of the present invention the radio access point is the first to learn of this problem. A path can fail, for example, when a radio station which was part of the path has moved away or when the radio transmission between two adjacent radio stations of the path is faulty. Subsequently the first radio station learns of the failure of the path that is known to it. After the interruption of the path is known to it, it initiates a method for determining a new path.

The result of the method for determining a new path between the radio station and the radio access point will usually be a path which is different from the previously used, known path. It is, however, also possible that in the course of the method for determining the new path a fault on the known path is repaired and therefore the new path is the same as the known path.

In a development of the invention the radio access point receives the information about the failure of the known path as a result of its own sending of information for the first radio station. Thus, for example, the radio access point can send payload data along the path to the first radio station. If the path fails, the radio access point then receives an error message that is transmitted back to it.

Advantageously the first radio station sends information for the radio access point for the purpose of determining the presence of a failure of the known path. Such a sending of information for determining the presence of a failure can take place in particular at regular time intervals. Alternatively, the time intervals at which information is sent can also be determined according to an algorithm or randomly. Allowance for different conditions within the radio communication system, such as, for example, density of the radio stations or mobility profiles, can be made using non-constant time intervals between the sending of the test data.

The first radio station can learn of the failure of the known path as a result of the sending of the information for the purpose of determining the presence of a failure. Thus, for example, test data can be sent from the first radio station via the path to the radio access point. In the event of a fault in the transmission of the test data an error message is transmitted back to the first radio station. In this case it is known to the first radio station that a failure of the previously used path is present.

In an embodiment of the invention the first radio station sends the information for the purpose of determining the presence of a failure as a result of at least one notification sent in the course of a preceding determination of the known path. This can be implemented for example through the first radio station and/or the radio access point signaling that in the event of the failure of the path they will proceed according to the inventive method. The first radio station can deduce from the signaling or the signaling exchange that it must send test data for the purpose of determining a failure. A signaling exchange of this kind advantageously takes place in the course of determining the path to whose future failure it relates.

In a development of the invention a base station is present which is located within the radio coverage area of the radio access point and the first radio station is located within its radio coverage area. The radio access point sends the base station information about the failure of the known path. The first radio station learns of the failure of the known path as a result of a notification by the base station. In the development of the invention described, sending of test data by the first radio station can be dispensed with, since the latter is informed by the base station if the radio access point discovers that the path between the first radio station and the radio access point has failed.

Advantageously the radio access point sends the base station the information about the failure of the known path as a result of at least one notification sent in the course of a preceding determination of the known path.

Thus, for example, with the method for determining the first path the first radio station and the radio access point can agree that the radio access point notifies the base station in the event that it discovers the failure of the path. In this case it is necessary to clarify whether both the radio access point and the first radio station are equipped in such a way that communication with the base station is possible for both.

A first radio station according to an aspect of the invention receives a notification to the effect that the radio access point requires information about a path that can be used for a message transfer between the radio access point and the radio station, the path comprising one or more further radio stations, and initiates a method for determining a path between the radio station and the radio access point following the reception of the notification.

A second radio station according to an aspect of the invention stores a path between the radio station and the radio access point comprising one or more further radio stations, so that information can be transferred from the radio station to the radio access point and from the radio access point to the radio station via the path. In addition it includes a unit for sending information for the radio access point for the purpose of determining the presence of a failure of the stored path, and unit(s) for receiving and processing information about the presence of a failure of the stored path, as well as capability for initiating a method for determining a new path between the radio station and the radio access point following the reception of information about the presence of a failure of the stored path.

The radio stations according to the invention are suitable in particular for performing the subscriber-side operations of a method according to the invention, whereby this can also apply to the embodiments and developments, and to this end can include further devices.

The inventive computer program product for a radio station is used for controlling at least one sending of information for a radio access point for the purpose of determining the presence of a failure of a path between the radio station and the radio access point. In particular the computer program products can be used to control the regular sending of information of this kind.

In the context of the present invention a computer program product is understood to mean, in addition to the actual computer program (with its technical effect going beyond the normal physical interaction between program and computing unit), in particular a recording medium for the computer program, a file collection, a configured computing unit, but also for example a storage device or a server on which files associated with the computer program are stored.

The computer program product according to the invention is suitable in particular for a radio station according to the invention and can be used for performing the method according to the invention. For this purpose it can have further functionalities, i.e. with regard to the computer program product the computer program can provide program sections for performing the above-described method and/or the method to be described in the exemplary embodiment below.

BRIEF DESCRIPTION OF THE DRAWINGS

These and other objects and advantages of the present invention will become more apparent and more readily appreciated from the following description of an exemplary embodiment, taken in conjunction with the accompanying drawings of which.

DETAILED DESCRIPTION OF THE PREFERRED EMBODIMENT

Figure 1:
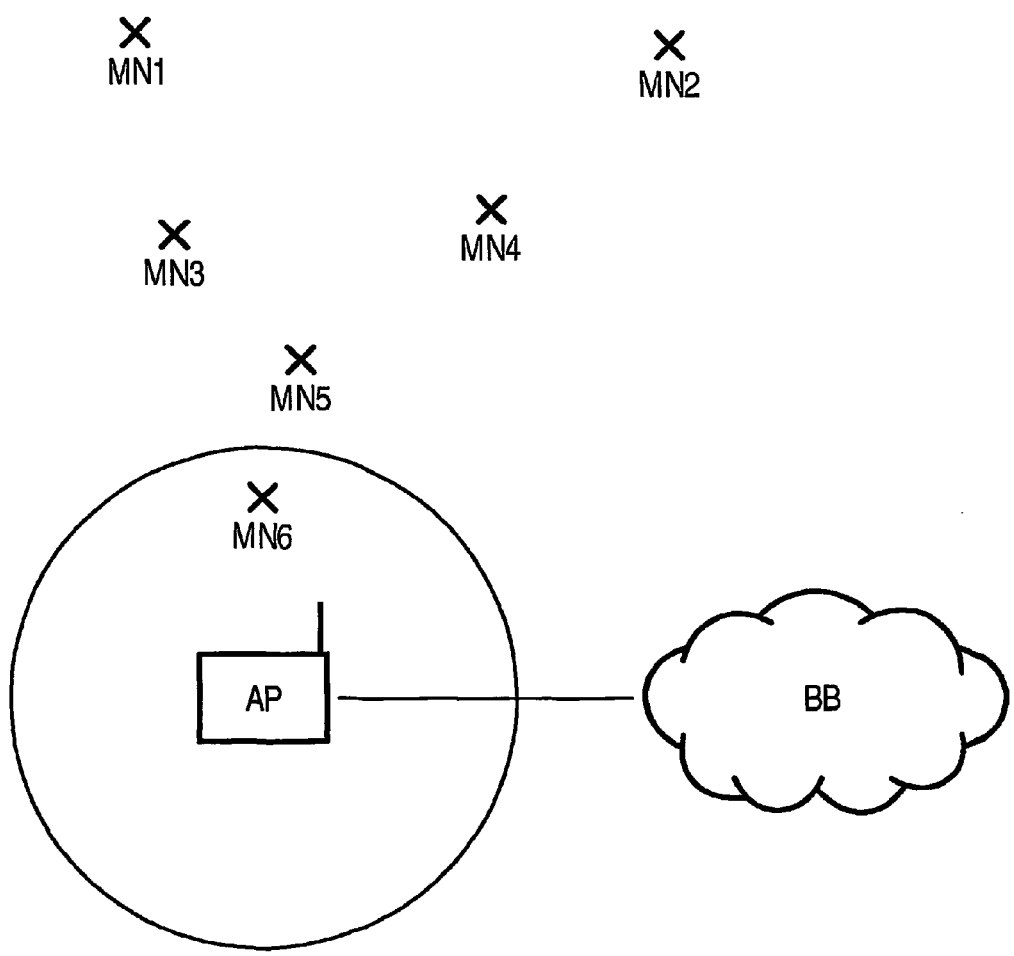
FIG. 1 is block diagram of a radio communication system in the form of a WLAN.

Reference will now be made in detail to the preferred embodiments of the present invention, examples of which are illustrated in the accompanying drawings, wherein like reference numerals refer to like elements throughout.

FIG. 1 shows a WLAN which includes a radio access point AP and the mobile radio stations MN1, MN2, MN3, MN4, MN5 and MN6. The radio access point AP is connected to a backbone network BB, so communication with other communication systems or data networks is possible for the radio stations MN1, MN2, MN3, MN4, MN5 and MN6 on the basis of connections of the backbone network to other networks. The direct radio coverage area of the radio access point AP is designated by a circle in FIG. 1. Thus, the radio station MN6 is located within the radio coverage area of the radio access point AP.

In the following the case will be considered in which the radio station MN1 wants to establish contact with the radio access point AP. As the radio station MN1 is not located within the radio coverage area of the radio access point AP, the data transfer between the radio station MN1 and the radio access point AP must take place via a path which is formed by other radio stations forwarding the data. Accordingly, a path between the radio station MN1 and the radio access point AP must be determined prior to the communication.

Before the radio station MN1 initiates a method for determining a path to the radio access point AP, it first checks whether it has stored such a path. If this is the case, it inserts this path into the header of a data packet that is to be sent to the radio access point AP.

If the radio station MN1 has not stored a path to the radio access point, the method for determining a path between the radio station MN1 and the radio access point AP is initiated by the radio station MN1 transmitting a request message for the path search (RREQ, Route Request). This request message includes information identifying the request (Request ID), a maximum number of hops of the path to be determined, which number should not be exceeded, and the address of the sender, i.e. the radio station MN1, and the address of the receiver, i.e. the radio access point AP.

Each radio station which receives the request message for determining the path first checks whether it has stored such a path to the destination station. If this is the case, it adds the stored path to the partial path contained in the possibly forwarded request message and sends the thus complete path as part of a reply message (RREP, Route Reply) by unicast or single transmit call back to the next radio station on the backward path to the sending radio station. If, on the other hand, a radio station which receives the request message or the forwarded request message has not stored a suitable path, it checks the identification information of the request message. If it establishes in this way that it has already received this request message previously, the request message is discarded and not forwarded a second time. Otherwise it subtracts the value 1 from the hop counter contained in the request message, inserts its own address into the request message and sends the inquiry onward by broadcast. When the hop counter reaches the value 0, the request message is discarded.

The radio station MN3 first receives the request message of the radio station MN1 transmitted by broadcast and forwards it as described above. If the request message reaches the radio access point AP via the radio stations MN5 and MN6 in this way, the radio access point AP sends back a reply message (RR, Route Reply) to the sending radio station MN1 via the determined path by unicast. The reply message covers the full path from the radio station MN1 to the radio access point AP. All the radio stations MN6, MN5 and MN3 along the path store this path information. In this way a path between the radio station MN1 and the radio access point AP is determined which includes the radio stations MN3, MN5 and MN6.

In the following the radio station MN2 initiates a method for determining a path to the radio access point AP. The radio station MN2 transmits a request message for determining a path by broadcast, which request message is received and forwarded by the radio station MN4. Next, the radio station MN5 receives the request message for determining a path and establishes that it has stored the partial path between the radio station MN5 and the radio access point AP as a result of the preceding path determination between the radio station MN1 and the radio access point AP. The radio station MN5 thereupon constructs the complete path between the radio station MN2 and the radio access point AP by merging the partial information from the request message and the stored path information and sends the complete path as reply via the radio station MN4 back to the radio station MN2.

In the example considered, in which first a path between the radio station MN1 and the radio access point AP was determined and subsequently a path between the radio station MN2 and the radio access point AP, the method for determining the path having been initiated by the radio station MN1 and MN2 respectively, a request message for determining the path was sent six times by broadcast and a reply message which contained the respective path was sent six times by unicast.

For the purpose of comparison the case will now be considered in which the methods for determining the paths between the radio stations MN1 and MN2 and the radio access point AP are initiated by the radio access point AP. First, the path between the radio access point AP and the radio station MN1 is to be determined. For this purpose the radio access point AP sends a request message for determining the path by broadcast to its neighboring radio stations. The radio station MN6 receives this request message and forwards it. The request message is forwarded as far as the radio station MN1 in the above-described manner. After the radio station MN1 has received the request message, it sends a reply message which includes the fully determined path back along this path to the radio access point AP. The radio stations along the path, i.e. the radio stations MN3, MN5 and MN6, store the determined path.

The radio access point AP now initiates the method for determining a path to the radio station MN2. For this purpose it transmits a request message for determining the path by broadcast, which message is received and forwarded by the radio station MN6. After the radio station MN5 has received the request message, it establishes that it has not stored the sought path and forwards the request message to the radio station MN4. After the request message has been received by the radio station MN2, it sends the fully determined path as part of a reply message via the determined path back to the radio access point AP.

According to what has been explained above, in order to determine the paths between the radio access point AP and the radio stations MN1 and MN2 it is necessary to broadcast eight request messages for determining the path and send eight reply messages which contained the complete path. It can be deduced from the example considered that in order to determine paths within the radio communication system under consideration a different number of signaling messages is necessary depending on whether the method for determining the path is initiated by a radio station or by the radio access point.

Following successful determination of a path between a radio station and the radio access point AP, the path can be used for transmitting messages between the radio station and the radio access point AP. For this purpose each radio station of the path checks upon receiving a data packet whether it is the recipient of the data packet. If this is not the case, the received data packet is forwarded by unicast to the next radio station according to the path contained in the header of the data packet. When the next radio station has received the forwarded packet, it sends a positive acknowledgement message (ACK, Acknowledge) back to the radio station forwarding the packet. If no such positive acknowledgement is sent, i.e. if the data packet was not forwarded successfully, then the radio station which received no positive acknowledgement sends an error message back via the path to the radio station originally transmitting the data packet. If the radio station originally transmitting the data packet or, as the case may be, the radio access point AP receives such an error message, the information about the failed path is deleted from the memory. The radio station receiving the error message or, as the case may be, the radio access point AP hereupon initiates a method for determining a new path according to the related art.

Figure 2:
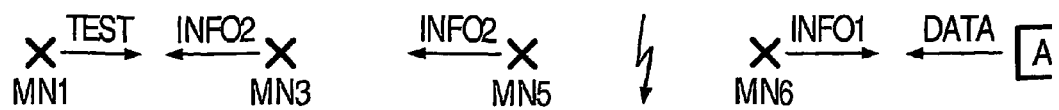
FIG. 2 is schematic diagram of a path within a WLAN for clarifying a first method sequence according to the invention.

FIG. 2 illustrates the case in which a path which includes the radio stations MN3, MN5 and MN6 has been determined between the radio station MN1 and the radio access point AP.

Following the determination of the path, the radio access point AP sends data DATA to the radio station MN6, which data is addressed to the radio station MN1 using the determined path. The radio station MN6 recognizes from the header of the data DATA that the latter is to be forwarded via the path via the radio stations MN5 and MN3 to the radio station MN1. The radio station MN6 therefore forwards the data to the radio station MN5 by unicast (single transmit call). In addition it sends a positive receive acknowledgement to the radio access point AP.

In the following it is assumed that the connection between the radio stations MN6 and MN5 is faulty, with the result that the radio station MN5 cannot receive the data DATA from the radio station MN6. The determined path between the radio station MN1 and the radio access point AP has therefore failed and cannot be used for transferring data at the present time. Due to the absence of a positive receive acknowledgement from the radio station MN5 the radio station MN6 sends a message INF01 back to the radio access point AP, which message INF01 informs the radio access point AP that the determined path between the radio station MN1 and the radio access point AP has failed. The message INF01 can also contain in particular information concerning at which position of the path the failure occurred.

Since, as disclosed above, it is disadvantageous if the radio access point AP initiates the method for determining a path to the radio station MN1, no request message for determining the path is sent by the radio access point AP. Instead, the radio station MN1 sends a message TEST via the determined path to the radio access point AP at regular time intervals. The message TEST serves for checking whether a failure of the determined path is present between the radio station MN1 and the radio access point AP. The message TEST is therefore forwarded along the path by the radio station MN3 and the radio station MN5. Since the radio station MN5 receives no positive receive acknowledgement for the message TEST from the radio station MN6 due to the failure of the path between the radio station MN5 and the radio station MN6, it sends a message INF02 back via the radio station MN3 to the radio station MN1, which message INF02 notifies the radio station MN1 of the failure of the path and possibly also of the position of the failure.

On account of the fact that the radio station MN1 now also knows that the previously determined path has failed, it can initiate a method for determining a new path. The method for determining the new path can be embodied in a variety of ways. It is important that although the radio access point AP was first to gain knowledge of the failure of the determined path, the method for determining the new path is initiated, not by the radio access point AP, but by the radio station MN1.

It is advantageous if a regular sending of messages TEST by the radio station MN1 during the determination of the first path has been agreed between the radio station MN1 and the radio access point AP. Such an agreement can be made for example in that the radio access point AP indicates during the first path determination using the reply message which includes the fully determined path that it will not initiate a method for determining a new path if the path fails. In this it is known to the radio station MN1 that it is its task to initiate such a method for determining a new path if the used path fails. It therefore sends messages TEST at regular time intervals in order to check whether a failure of the path is present.

Figure 3:
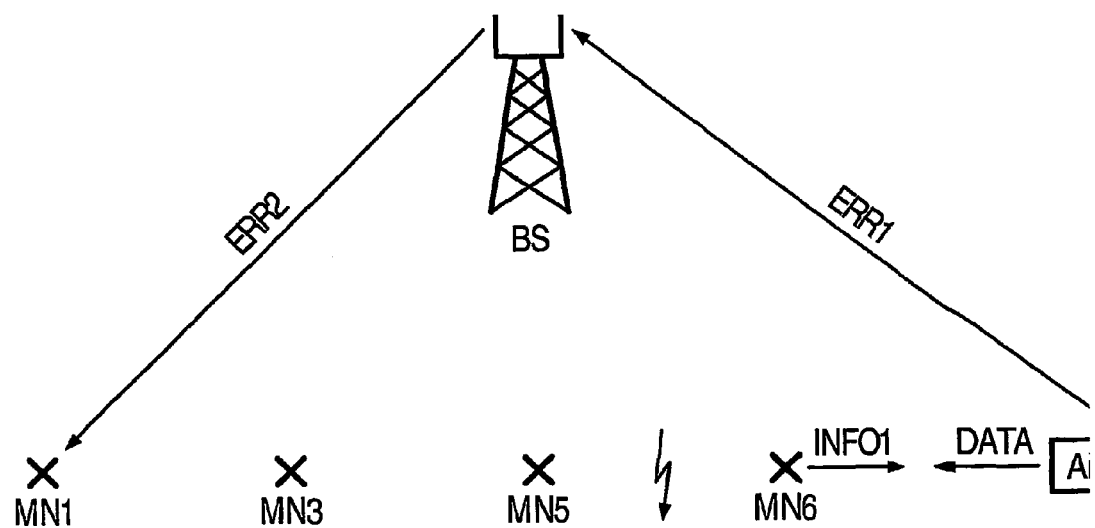
FIG. 3 is schematic diagram of a path within a WLAN for clarifying a second method sequence according to the invention.

In FIG. 3 an arrangement is considered in which both the radio station MN1 and the radio access point AP are located within the radio coverage area of a base station BS. The base station BS may be, for example, a NodeB of a radio communication system of the third generation. It is assumed that the radio stations can communicate both with the base station BS of the cellular radio communication system and with the radio access point AP of the WLAN, so they have two radio interfaces. The base station BS is, for its part, connected to a core network which can also be connected in particular to the backbone network of the radio access point AP.

As already described above, the radio access point AP discovers that the path between the radio station MN1 and the radio access point AP has failed by sending data DATA, whereupon the radio station MN6 sends back a message INFO1 which contains information about the failure of the path. The radio access point AP thereupon sends an error message ERR1 to the base station, which error message ERR1 informs the base station BS that the path between the radio station MN1 and the radio access point AP has failed. Since the base station BS has no knowledge of the current network topology, it is not able to determine a new path between the radio station MN1 and the radio access point AP and to forward this to the radio stations and the radio access point. Instead the base station BS sends an error message ERR2 to the radio station MN1, by which error message ERR2 the radio station MN1 is made aware that the path between the radio station MN1 and the radio access point AP has failed. The message ERR2 can include the naming of the position of the failure. After receiving the error message error message ERR2, the radio station MN1 initiates a method for determining a new path between the radio station MN1 and the radio access point AP. In this second embodiment of the invention also, the radio station MN1 therefore learns about the failure of the previously used path only after the radio access point AP. Nonetheless the method for determining a new path is initiated by the radio station MN1, not by the radio access point AP.

Advantageously the radio station MN1 and the radio access point AP should agree during the preceding determination of a path that the procedure as illustrated in FIG. 3 should be followed in the event of failure of the path. For this purpose the radio station MN1 and the radio access point AP should mutually inform each other that they are each capable of communicating with the base station BS. This can be done as part of the request message for determining the path and as part of the associated reply message which includes the fully determined path. If both the radio station MN1 and the radio access point AP indicate that they can communicate with the base station BS on the basis of their radio interfaces, this corresponds to the agreement that in the event that the radio access point AP notices the failure of the path, this failure is reported to the radio station MN1 via the base station BS, whereupon the radio station MN1 initiates the method for determining a new path.

If, in one of the two situations depicted in FIG. 2 or FIG. 3, the radio station MN1 is first to discover the failure of the path used for communication, then the radio station MN1 can, in a manner which corresponds to a known approach, initiate the method for determining a new path.

Figure 4:
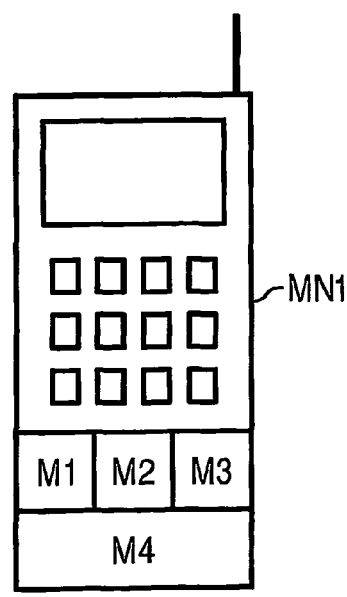
FIG. 4 is block diagram of a radio station according to the invention.

FIG. 4 shows a radio station MN1 according to an aspect of the invention for performing the described method. The radio station MN1 has a unit MI for storing a path that has already been determined, as well as a unit M2 for sending data for the radio access point for the purpose of checking whether a failure of the path used for communication is present, plus a unit M3 for receiving and processing information about a failure of the path, and finally a unit M4 for initiating a method for determining a new path. The unit M4 can be used during the preceding determination of a path between the radio station MN1 and the radio access point, but in particular, however, following the reception of a message which indicates the failure of the path.

The described case of the failure of a known path is merely an example of a situation in which the invention can be used. Generally the invention can be applied to situations in which a radio access point is first to learn that a path is required between the radio access point and a radio station, and the radio station acquires this knowledge subsequently. According to an aspect of the invention the determination of the path is then started, not by the radio access point, but by the radio station. This situation is encountered, for example, in the case of a "mobile terminated call", i.e. when one or more messages for the radio station are present at the radio access point without a connection existing between the radio access point and the radio station or without a path between the radio station and the radio access point being known.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV* 69 USPQ2d 1865 (Fed. Cir. 2004).

The invention claimed is:

1. A method for operating a radio communication system with a radio access point and a plurality of radio stations including a terminal radio station, said method comprising:

providing, path information about a path formed of at least one further radio station of the plurality of radio stations usable for a message transfer between the radio access point and the terminal radio station, to the radio access point responsive to a requirement from the radio access point prior to the message transfer;

learning, at the terminal radio station, about the requirement for the path information that was initiated at the radio access point, said terminal radio station located outside of direct radio transmission range of the radio access point; and initiating, at the terminal radio station, a method to determine the path between the terminal radio station and the radio access point subsequent to said learning of the requirement for the path information and to fulfill the requirement initiated by the radio access point, where the initiating includes sending a request message to at least one station to determine the path.

2. The method as claimed in claim 1,
wherein the radio communication system includes a base station located inside the direct radio transmission range of the radio access point and the terminal radio station is located within a radio coverage area of the base station,
wherein said method further comprises notifying the base station by the radio access point about the requirement for the path information, and
wherein said learning by the terminal radio station about the requirement for the path information is a result of a notification by the base station.

3. The method as claimed in claim 1, wherein a known path between the terminal radio station and the radio access point formed of at least one further radio station is known to the terminal radio station and the radio access point, enabling data to be transferred from the terminal radio station to the radio access point and from the radio access point to the terminal radio station via the path, and
wherein said method further comprises
receiving, at the radio access point, failure information about failure of the known path from a radio station of the path;
learning at the terminal radio station about the failure of the known path after the radio access point learns about the failure; and
initiating, at the terminal radio station, a method for determining a new path between the terminal radio station and the radio access point.

4. The method as claimed in claim 3, wherein said learning about the failure of the known path at the radio access point results from information received in response to sending data from the radio access point to the terminal radio station.

5. The method as claimed in claim 3, wherein said method further comprises sending test data for the radio access point from the terminal radio station to determine whether the failure exists in the known path.

6. The method as claimed in claim 5, wherein said sending of the test data takes place at regular time intervals.

7. The method as claimed in claim 5, wherein said learning about the failure of the known path at the terminal radio station results from said sending of the test data to determine whether the failure exists in the known path.

8. The method as claimed in claim 5, wherein said sending of the test data by the terminal radio station to determine whether the failure exists in the known path results from at least one notification sent as a result of a preceding determination of the known path.

9. A first radio station for a radio communication system, the radio communication system comprising a radio access point and at least one second radio station in addition to the first radio station, the first radio station comprising:
means for providing, path information about a path formed of at least one further radio station of a plurality of radio stations, the at least one further radio station located within a radio coverage area of the radio access point, usable for a message transfer between the radio access point and the first radio station, to the radio access point responsive to a requirement from the radio access point prior to the message transfer;
means for receiving a notification that the radio access point initiated a requirement for information about a path, the path formed of at least one of the second radio stations that can be used for a message transfer between the radio access point and said first radio station; and
means for initiating a method to determine the path between said first radio station and the radio access point following reception of the notification that the radio access point initiated the requirement for information, where the path is determined responsive to the requirement prior to the message transfer and said initiating includes sending a request message to at least one station to determine the path.

10. A first radio station for a radio communication system, the radio communication system formed of a radio access point and at least one second radio station in addition to the first radio station, the first radio station comprising:
means for providing, path information about a path formed of at least one further radio station of a plurality of radio stations, the at least one further radio station located within a radio coverage area of the radio access point, usable for a message transfer between the radio access point and the first radio station, to the radio access point responsive to a requirement from the radio access point prior to the message transfer;
means for storing a path between said first radio station and the radio access point, where the path is formed of at least one of the second radio stations and enabling data to be transferred from said first radio station to the radio access point and from the radio access point to said first radio station via the path;
means for sending test data for the radio access point to determine whether a failure of the path exists;
means for receiving and processing failure information about presence of a failure of the stored path, said storing of the path being prior to the processing failure information; and
means for initiating a method to determine a new path between said first radio station and the radio access point following reception of the failure information, where the initiating includes sending a request message to at least one station to determine the new path.

11. A non-transitory computer readable medium storing instructions that when executed control at least one processor in a first radio station to perform a method comprising:
storing a path between the first radio station and a radio access point, where the path includes at least one second radio station located within a radio coverage area of the radio access point, and enabling data to be transferred from the first radio station to the radio access point and from the radio access point to the first radio station via the path;
sending test data for the radio access point to determine whether a failure of the path exists;
receiving and processing failure information about presence of a failure of the stored path, said storing of the path being prior to the processing failure information; and
initiating a method to determine a new path between the first radio station and the radio access point following reception of the failure information, where the initiating includes sending a request message to at least one station to determine the new path.

* * * * *